(No Model.)
P. V. WESTFALL.
COTTON GIN.
No. 258,515. Patented May 23, 1882.
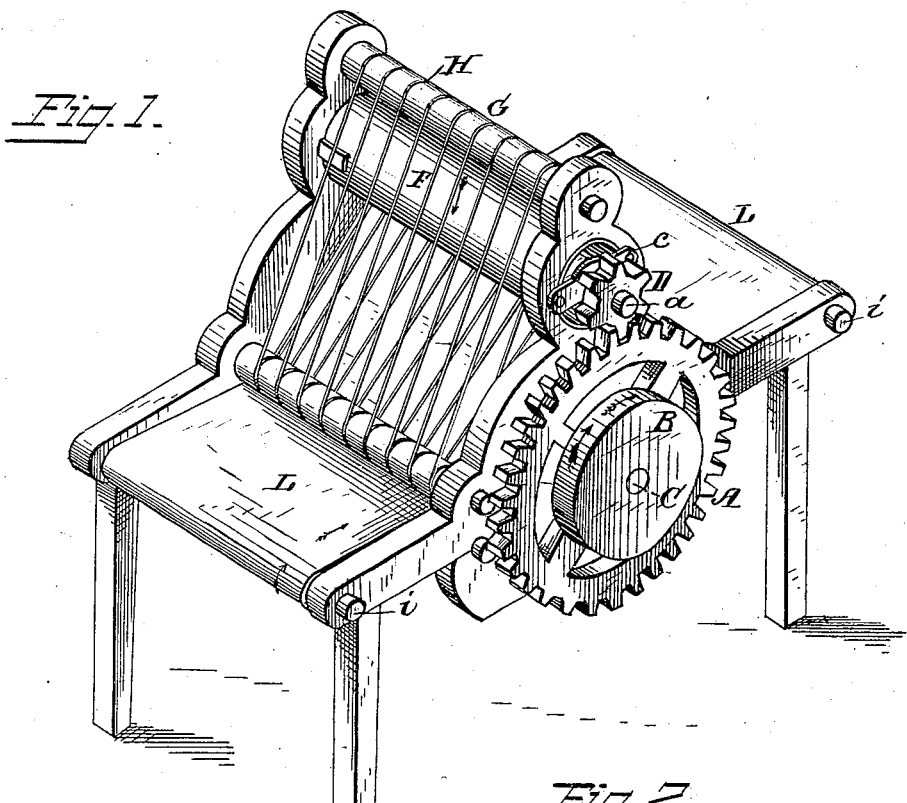
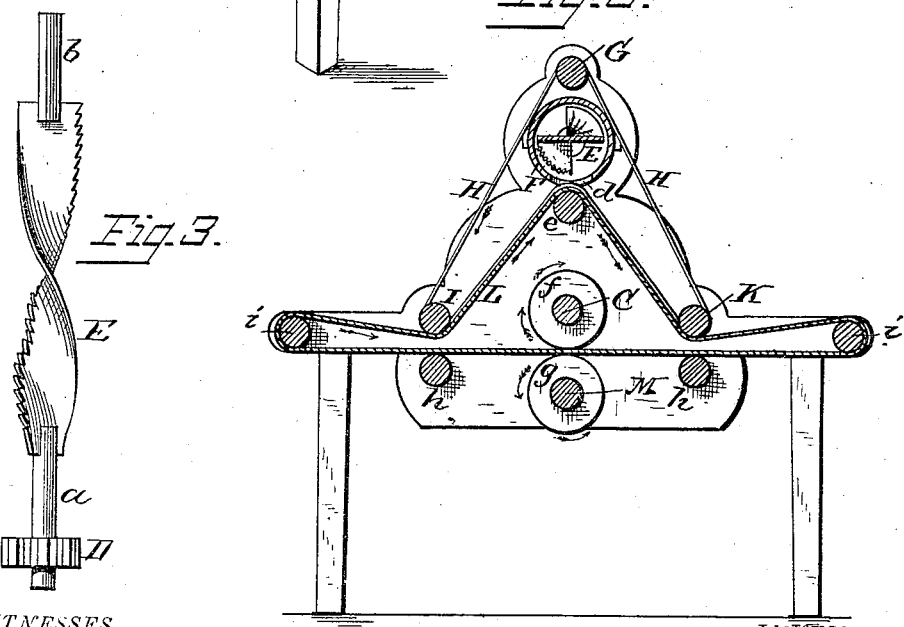
WITNESSES
Franck L. Ourand.
N. E. Oliphant,
INVENTOR
Peter V. Westfall.
per Chas. H. Fowler
Attorney

UNITED STATES PATENT OFFICE.

PETER V. WESTFALL, OF KALAMAZOO, MICHIGAN, ASSIGNOR OF ONE-HALF TO WILLIAM NELSON, OF SAME PLACE.

COTTON-GIN.

SPECIFICATION forming part of Letters Patent No. 258,515, dated May 23, 1882.

Application filed April 4, 1882. (No model.)

*To all whom it may concern:*

Be it known that I, PETER V. WESTFALL, a citizen of the United States, residing at Kalamazoo, in the county of Kalamazoo and State of Michigan, have invented certain new and useful Improvements in Cotton-Gins; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a longitudinal vertical section of the same, and Fig. 3 a detail view of the comb.

This invention relates to cotton cleaners; and the object thereof is to provide a machine for cleaning cotton that will be simple in its construction and at the same time thoroughly cleanse the cotton of seed and other impurities without doing injury to the staple. These objects I attain by the construction substantially as shown in the drawings, and hereinafter described and claimed.

In the accompanying drawings, A represents a large gear-wheel provided with a driving-pulley, B, keyed to a main shaft, C, journaled in the frame-work of the machine. This large driving gear-wheel A meshes with a smaller gear-wheel, D, upon a short journal-shaft, $a$, made fast to one end of a spiral comb, E, the other end of the comb being provided with a similar journal-shaft, $b$, said journaled shafts $a$ $b$ working in bearings $c$ at the ends of a hollow cylinder, F, in which the comb revolves. This hollow cylinder is fitted in the frame of the cleaner, and is provided with an elongated opening, $d$, to allow of the comb coming in contact with the cotton.

Journaled in the frame above the comb-cylinder F is a roller, G, provided with a series of grooves placed at suitable distances apart, in which operate endless wires H, working on similar rollers, I K, and over an endless apron, L, which is carried over a roller, $e$, also journaled in the frame directly below the opening $d$ of the comb-cylinder. The apron L is rotated by means of friction-wheels $f$ on the main shaft C, which are revolved above the apron, in conjunction with similar wheels, $g$, on a counter-shaft, M, journaled in the frame directly below the main shaft, said friction-wheels $g$ revolving under the apron directly beneath the friction-wheels $f$, thereby causing its rotation by frictional contact. The counter-shaft M may be adjustably fitted in the frame to allow of the frictional bearing of the wheels $f$ $g$ being increased or diminished to regulate the speed of the apron. The apron, being placed between the friction-wheels $f$ $g$, is carried over rollers $h$ and around rollers $i$, under wires H, working around the grooved rollers I K, and up under the wires and over roller $e$. This roller $e$ being on the line of center between the grooved rollers I K, at an elevation thereto, causes the wires and apron to be elevated to nearly an acute angle.

The cotton to be cleaned is fed on the apron at the front end of the machine, and is carried thereby under the wires, which hold it firmly upon the said apron, up under the elongated opening in the comb-cylinder. As the cotton passes under the opening $d$ of the cylinder the wires, being of suitable distances apart, allow of the comb coming in contact therewith to remove the seed and other impurities, said impurities being forced out at the ends of the cylinder by the rapid revolution of the comb. This comb is of a spiral form and serrated upon one face, while the other is made plain to beat down the cotton as it is raised by the serrations, thereby preventing the staple from being drawn into the cylinder with the seeds and other impurities. The wires working on the grooved rollers form a jacket, which firmly holds the cotton on the apron and prevents it from being caught up too far by the serrations on the comb. After the cotton has been brought under the opening in the comb-cylinder and the impurities removed it is carried on by the apron under the wires to the point of discharge at the rear end of the machine.

Having now fully described my invention, what I claim as new, and desire to secure by Letters Patent, is—

1. In a cotton-cleaner, the combination, with a hollow cylinder having an elongated opening and a spiral comb, of an endless rotating apron for feeding the cotton to the comb, and endless rotating wires working on grooved rollers for holding the cotton on the apron, substantially as shown and described.

2. In a cotton-cleaner, the combination, with the cylinder F, having elongated opening $d$, of the revolving spiral comb E, having one of its faces serrated and the other plain, substantially as and for the purpose set forth.

3. In a cotton-cleaner, the spiral comb E, endless apron L, friction-wheels $f\,g$, and rollers $e\,h\,i$, in combination with grooved rollers G I K, rotating wires H, said wires and apron being elevated to an acute angle, the main shaft, driving gear-wheel, and a smaller gear-wheel upon one of the journals of the comb, substantially as and for the purpose specified.

4. In a cotton-cleaner, the hollow slotted cylinder F, revolving spiral comb E, grooved rollers G I K, wires H, rollers $e\,h\,i$, main shaft C, counter-shaft M, and friction-wheels $f\,g$, all arranged to operate substantially as described.

In testimony that I claim the above I have hereunto subscribed my name in the presence of two witnesses.

PETER V. WESTFALL.

Witnesses:
RUFUS H. GROSVENOR,
JAMES H. SWEET.